US010363979B2

(12) United States Patent
Haug et al.

(10) Patent No.: US 10,363,979 B2
(45) Date of Patent: Jul. 30, 2019

(54) GROUP OF MOTOR VEHICLES

(71) Applicant: Bayerische Motoren Werke Aktiengesellschaft, Munich (DE)

(72) Inventors: Wolfram Haug, Sauerlach (DE); Mike Reichelt, Manching (DE); Philip Koehn, Munich (DE); Michael Ahlers, Munich (DE); Joerg Kutzschbach, Petershausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 24 days.

(21) Appl. No.: 15/828,588

(22) Filed: Dec. 1, 2017

(65) Prior Publication Data

US 2018/0086401 A1 Mar. 29, 2018

Related U.S. Application Data

(63) Continuation of application No. PCT/EP2016/060052, filed on May 4, 2016.

(30) Foreign Application Priority Data

Jun. 3, 2015 (DE) .................... 10 2015 210 330

(51) Int. Cl.
*B60J 7/00* (2006.01)
*B62D 63/02* (2006.01)
(Continued)

(52) U.S. Cl.
CPC ......... *B62D 63/025* (2013.01); *B62D 25/085* (2013.01); *B62D 25/2018* (2013.01); *B60K 5/12* (2013.01); *B60N 2/01* (2013.01)

(58) Field of Classification Search
CPC ...... B62D 31/003; G07C 5/008; A63G 31/16; B65D 2585/6867; B65D 88/121;
(Continued)

(56) References Cited

U.S. PATENT DOCUMENTS 4,842,326 A * 6/1989 DiVito ...................... B60P 3/42
296/10
4,865,378 A 9/1989 Filtri et al.
(Continued)

FOREIGN PATENT DOCUMENTS

DE 26 10 299 A1 9/1977
DE 29 23 874 A1 1/1981
(Continued)

OTHER PUBLICATIONS

International Search Report (PCT/ISA/210) issued in PCT Application No. PCT/EP2016/060052 dated Aug. 12, 2016 with English translation (Six (6) pages).
(Continued)

*Primary Examiner* — Kiran B Patel
(74) *Attorney, Agent, or Firm* — Crowell & Moring LLP

(57) ABSTRACT

By combining at least two different vehicle front end modules and passenger cell modules, at least two groups of motor vehicles belonging to different vehicle categories can be formed. For this purpose, the two vehicle front end modules feature different distances between the engine mounts, and the two passenger cell modules feature different distances between the front seats. The individual variants of each of the four modules are designed as identical parts and are manufactured in uniform deep-drawing dies for each module.

13 Claims, 11 Drawing Sheets

(51) Int. Cl.
  *B62D 25/08* (2006.01)
  *B62D 25/20* (2006.01)
  *B60K 5/12* (2006.01)
  *B60N 2/01* (2006.01)

(58) Field of Classification Search
  CPC ..... B60R 9/10; Y10S 224/924; B60C 23/003; B60G 11/14; B60G 15/07
  USPC .................................................. 296/193.04
  See application file for complete search history.

(56) References Cited

U.S. PATENT DOCUMENTS

| | | | | |
|---|---|---|---|---|
| 5,090,105 | A * | 2/1992 | DeRees | B62D 63/025 29/460 |
| 6,729,682 | B2 * | 5/2004 | Delavalle | B62D 25/08 296/193.08 |
| 6,773,056 | B2 * | 8/2004 | Fischer | B62D 33/06 296/190.08 |
| 6,846,037 | B2 * | 1/2005 | Engels | B60R 19/18 296/187.11 |
| 6,896,319 | B1 * | 5/2005 | Huang | B62D 21/12 296/193.04 |
| 6,923,282 | B2 * | 8/2005 | Chernoff | B60G 17/0195 180/312 |
| 6,955,393 | B2 * | 10/2005 | Staargaard | B29C 45/14344 180/68.4 |
| 6,983,971 | B2 * | 1/2006 | Broadhead | B60R 5/044 296/193.04 |
| 7,237,835 | B2 * | 7/2007 | Leroy | B60J 7/02 224/316 |
| 7,441,827 | B2 * | 10/2008 | Bonneau | B62D 25/087 296/146.11 |
| 7,905,540 | B2 * | 3/2011 | Kiley | B62D 63/025 296/193.04 |
| 7,967,373 | B2 * | 6/2011 | Ritz | B62D 25/084 296/193.09 |
| 8,196,978 | B2 * | 6/2012 | Shin | B62D 25/084 180/68.6 |
| 8,240,748 | B2 * | 8/2012 | Chapman | A61G 3/00 296/187.07 |
| 8,474,902 | B2 * | 7/2013 | Malek | B62D 25/145 296/193.02 |
| 8,567,849 | B2 * | 10/2013 | Rawlinson | B62D 21/152 296/187.09 |
| 8,622,466 | B2 * | 1/2014 | Joly-Pottuz | B62D 25/085 180/68.4 |
| 8,807,631 | B2 * | 8/2014 | Grevener | B62D 25/2009 296/181.1 |
| 8,894,132 | B2 * | 11/2014 | Goettker | B29C 70/48 296/203.01 |
| 9,163,395 | B2 * | 10/2015 | Finney | E04B 1/34363 |
| 9,409,471 | B2 * | 8/2016 | Hoppe | F41H 7/048 |
| 9,676,423 | B2 * | 6/2017 | Hulbert | B60K 15/07 |
| 10,086,891 | B2 * | 10/2018 | Hung | B60L 11/18 |
| 2005/0082782 | A1 * | 4/2005 | Jolley | B60K 17/22 280/124.109 |
| 2006/0108834 | A1 | 5/2006 | Boulay et al. | |
| 2006/0170188 | A1 * | 8/2006 | Negre | B62D 47/025 280/403 |
| 2008/0017426 | A1 * | 1/2008 | Walters | B60F 3/003 180/89.1 |
| 2008/0308332 | A1 * | 12/2008 | Gonzalez-Salvador | B62D 25/084 180/68.4 |
| 2010/0123334 | A1 * | 5/2010 | Ische | B60P 3/42 296/193.04 |
| 2010/0156145 | A1 * | 6/2010 | Schmidt | B62D 25/082 296/193.04 |
| 2010/0201160 | A1 * | 8/2010 | Greb | B60K 11/02 296/193.04 |
| 2010/0276970 | A1 * | 11/2010 | Lorenzo | B62D 39/00 296/193.04 |
| 2011/0291444 | A1 * | 12/2011 | Ische | B60P 3/42 296/193.04 |
| 2012/0153673 | A1 * | 6/2012 | De Luca | B62D 25/087 296/193.04 |
| 2012/0175914 | A1 * | 7/2012 | De Luca | B62D 25/087 296/193.04 |
| 2012/0235445 | A1 * | 9/2012 | De Luca | B62D 25/20 296/193.04 |
| 2013/0241237 | A1 * | 9/2013 | Dziuba | B62D 21/11 296/193.04 |
| 2014/0252805 | A1 | 9/2014 | Grosse et al. | |
| 2017/0240215 | A1 * | 8/2017 | LaRose | B62D 31/025 |

FOREIGN PATENT DOCUMENTS

| | | |
|---|---|---|
| DE | 38 72 316 T2 | 12/1992 |
| DE | 197 01 571 A1 | 7/1998 |
| DE | 198 33 395 A1 | 2/2000 |
| DE | 198 60 794 A1 | 7/2000 |
| DE | 198 33 395 C2 | 6/2002 |
| DE | 101 50 052 A1 | 4/2003 |
| DE | 10 2004 045 868 A1 | 4/2006 |
| DE | 10 2007 001 719 A1 | 7/2008 |
| DE | 10 2007 021 876 A1 | 11/2008 |
| DE | 10 2008 055 738 A1 | 5/2010 |
| DE | 10 2009 050 470 A1 | 5/2011 |
| DE | 10 2010 005 426 A1 | 7/2011 |
| EP | 0 291 385 A1 | 11/1988 |
| EP | 0 512 576 A1 | 11/1992 |
| EP | 0 584 576 A1 | 3/1994 |
| GB | 2504997 A | 2/2014 |
| WO | WO 2004/024543 A1 | 3/2004 |
| WO | WO 2006/026942 A1 | 3/2006 |
| WO | WO 2013/076016 A1 | 5/2013 |

OTHER PUBLICATIONS

German-language Written Opinion (PCT/ISA/237) issued in PCT Application No. PCT/EP2016/060052 dated Aug. 12, 2016 (Nine (9) pages).

German-language Search Report issued in counterpart German Application No. 10 2015 210 330.7 dated Jun. 22, 2016 with partial English translation (Twelve (12) pages).

Chinese-language Office Action issued in counterpart Chinese Application No. 201680031682.X dated Jan. 31, 2019 with English translation (16 pages).

\* cited by examiner

GROUP OF MOTOR VEHICLES

CROSS REFERENCE TO RELATED APPLICATIONS

This application is a continuation of PCT International Application No. PCT/EP2016/060052, filed May 4, 2016, which claims priority under 35 U.S.C. § 119 from German Patent Application No. 10 2015 210 330.7, filed Jun. 3, 2015, the entire disclosures of which are herein expressly incorporated by reference.

BACKGROUND AND SUMMARY OF THE INVENTION

The invention relates to a group of motor vehicles.

Motor vehicles are classified in various vehicle classes in accordance with the shape, size and/or the price point thereof. In this case, the term "vehicle segment" is also used instead of the term "vehicle class". For example, the European Commission has defined the following vehicle classes for the competition law market definition: very small cars, small cars, middle class, upper middle class, upper class, luxury class. The German Federal Motor Transport Authority distinguishes between the following vehicle classes: minis, small cars, compact class, middle class, upper middle class, upper class. In addition, there are additional categories, for example, for all-terrain vehicles, sports cars, cabriolets, mini-vans, and multi-purpose vehicles.

In order to increase the efficiency of the production process, manufacturers of motor vehicles use uniform carcass components to the greatest possible extent for the bodies-in-white of the motor vehicles thereof. In this case, the object is also to use such "common components" generally in motor vehicles of different vehicle classes. As a result of using common components, investment in the tools and installations can be substantially reduced in the pressing plant and in terms of body carcasses. The use of common components is known with some manufacturers of vehicles, for example, using the term "platform strategy".

Thus, for example, it is known from WO 2013/076016 A1 to form a group of motor vehicles which belong to different vehicle classes by at least two differently constructed rear-end modules ("rear construction" of the motor vehicle). In this case, the rear longitudinal carriers of the rear-end modules are constructed to be uniform in terms of the middle and rear part-region thereof, that is to say, as common components. Only the front part-region of the rear longitudinal carriers is constructed to be different depending on the vehicle class.

An object of the invention is to provide a new approach for producing bodies-in-white for motor vehicles of different vehicle classes which allows a clear differentiation between the different vehicle classes with the most extensive possible use of common components, in particular in the front and middle portion of the carrier structure of the motor vehicle ("front-end module" or "passenger cell module").

This and other objects are achieved by a group of motor vehicles wherein the motor vehicles of each group have at least one module which is constructed as a common component. At least two front-end modules with different spacings of the engine mounts and at least two passenger cell modules with different spacings of the front seats are provided, wherein the front-end modules and the passenger cell modules are combinable in such a manner that at least two groups of motor vehicles of different vehicle classes are produced.

The term "group of motor vehicles" is intended to be understood in connection with the present invention to mean the entirety of motor vehicles of at least a first and a second vehicle series, wherein the two vehicle series belong to different vehicle classes. Naturally, the bodies-in-white of more than two vehicle series can also be combined to form a group of motor vehicles.

The core notion of the invention is to provide a "front-end module" and a "passenger cell module", wherein the two modules can be combined in spite of a different construction without limitation, and motor vehicles of different vehicle classes can thereby be constituted. The core notion is in this instance, on the one hand, to provide the front-end module with different engine mount spacings and, on the other hand, to provide the passenger cell module with different spacings of the front seats, but furthermore to configure as many connecting dimensions as possible in a uniform manner for the two modules.

As a result, standardized interfaces can be provided in order to be able to combine the two modules with each other irrespective of the different configurations thereof.

In this case, each of the at least four modules is constructed as a "common component", that is to say, all the variants of one of the modules are "common components" (see definition below).

The spacings of the engine mounts or the front seats each relate to the width extent Y of the vehicle, that is to say, transversely to the longitudinal direction X of the vehicle.

As a result of the invention, it is possible in a particularly efficient manner to provide a width expansion on the front-end module for different drive units and a width expansion on the passenger cell module for different inner space widths. These two measures are, if naturally not exclusively, then substantially suitable for a differentiation of motor vehicles of different vehicle classes.

The term "different spacing of the front seats" is intended to be understood to mean that this spacing actually acts on the seat position of an occupant, that is to say, a greater spacing of the front seats acts as greater spacing of the occupants relative to each other. Again, that is to say, as a result of the different spacing of the front seats, the so-called H points (hip points) or R points (seat reference points) of the occupants are located at different distances from each other in the transverse direction Y of the vehicle. The important aspect is to produce seat spacings which are adequate in accordance with the vehicle classes. In addition to the spacing of the front seats relative to each other, the passenger cell modules can also have different positions of the seats in a longitudinal direction X of the vehicle.

As a result of the invention, it is advantageously possible to constitute motor vehicles of three vehicle classes, for example, motor vehicles of the upper class, the upper middle class and the middle class. This constitution can also include additional motor vehicles which are derived from the individual vehicle classes, such as, for example, all-terrain vehicles, sports cars, cabriolets, mini-vans, multi-purpose vehicles, etc.

An important aspect for the entire configuration and the outward appearance of a motor vehicle is the spacing thereof between the center of the front wheels and the instrument panel ("dash/axle spacing"). In order to distinguish between vehicles of the individual vehicle classes, this spacing must be varied accordingly within the context of the scaling possibilities.

The front-end module is configured in an embodiment of the invention so that it has uniform receiving members for different types of drive systems (rear-wheel drive or all-wheel drive), drive units (for example, Otto-type or diesel-type internal combustion engines, in-line engines, V-type engines, where applicable each having different numbers of cylinders), gear mechanisms (gearboxes, automatic gear mechanisms, double clutch mechanisms) and front axle systems (for example, telescopic leg axle, double wishbone axle). The configuration according to the invention makes it possible for there to be in each front-end module only uniform receiving members for the respective units and systems. Where applicable, limitations are connected therewith so that, for example, in a "small" front-end module there is no "space" for the largest category of drive units and consequently this possible combination is eliminated, which for economic reasons is, however, accepted. However, the exclusions which result for technical reasons for specific possible combinations are compensated for by the advantages from standardizing the modules and therefore the more economical production.

A major factor for the group of motor vehicles according to the invention is the use of uniform drive trains for the motor vehicles within a front-end module, with uniform bearing locations for the engine and/or gear mechanism, with uniform angles of inclination of the engines, irrespective of whether a gasoline engine or a diesel engine is involved, whether the motor vehicle is provided with a rear wheel drive or with all-wheel drive, whether the motor vehicle further has an electric motor as a drive unit in addition to the internal combustion engine (hybrid vehicle), etc.

Another factor in standardizing the drive train is, for example, the continuous use of a chain distribution gear in place of a toothed wheel distribution gear, with advantages with regard to the degree of efficiency, costs and weight, preferably in conjunction with an output shaft which is "near the gear mechanism" from the distribution gear to the front axle gear mechanism. The position of the front axle system, the steering gear, the distribution gear output and/or the front axle gear mechanism is preferably standardized.

The uniform position of the drive train is, for example, defined by the dimension between the center of the front wheels and a fixed coordinate of the drive unit. Similarly, for example, the dimension between the rear edge of the drive unit and the position of the output of the distribution gear mechanism can be standardized. In a particularly advantageous manner, the position of the engine bearings and/or the gear transmission bearings is standardized.

The engine-specific interfaces, for example, the limit contours of the engine-outlet-side end of the exhaust installation ("hot end") and/or the air intake installation, the position of the gear mechanism and/or the front axle gear mechanism, etc., are identical for all the variants of the motorizations within a module.

In an embodiment of the invention, the passenger cell module is constructed in such a manner that it positions the driver seat and passenger seat differently depending on the vehicle class both in relation to the transverse direction of the vehicle and/or in relation to the longitudinal direction of the vehicle. Furthermore, the vertical positioning of the driver seat and passenger seat can also be different for different passenger cell modules in order to achieve a differentiation, for example, between sedans, coupes or the like, on the one hand, and all-terrain vehicles, multi-purpose vehicles or the like, on the other hand.

As already explained above, there are produced in the transverse direction of the vehicle different spacings of the H points or R points between the driver and passenger. This spacing between the two front occupants of a motor vehicle is decisive for the feeling of space in the respective vehicle class. Furthermore, the configuration of the central console and/or the "center stack" is important in this case.

The spacing between the front seats can also influence the dimensioning and the positioning of fitted members in the inner space, for example, the size of an air-conditioning unit and/or a head-up display, the position of the pedals and/or the steering installation so that these fitted members can be configured and positioned adequately relative to the vehicle class. In the case of the air-conditioning unit and head-up display, this affects the position in a longitudinal direction X of the vehicle. The position of the pedals and the steering installation relates primarily to the transverse direction Y of the vehicle. Furthermore, the passenger cell module can be configured in such a manner that it can receive when necessary a so-called "central bass", that is to say, a centrally arranged loudspeaker for reproducing the low frequencies.

The size classification (scaling) of the motor vehicles of different vehicle classes in the passenger cell region is carried out in the longitudinal direction of the vehicle as a result of the positioning of the seats for the front occupants. This is achieved by different positions of the transverse seat carriers for the driver and passenger seat in relation to the front wall. As a result of this scaling, the outer size of the vehicles and/or the provision of space inside the vehicles are constituted. The dimension for this is the spacing between the center of the front wheels and the R point. Similarly, the spacing of the R point with respect to the engine can be used as a reference.

Furthermore, the passenger cell module can be constructed to receive different air-conditioning units, for example, a two-zone air-conditioning unit (with control of the air-conditioning at the front seats; with limited control of the air-conditioning for the back seats, this is a so-called 2.5-zone air-conditioning unit) or a four-zone air-conditioning unit with independent control of the air-conditioning at the front seats or rear seats. The air-conditioning unit is preferably air-controlled.

The term "air-conditioning unit" is intended to be understood to be a system for heating and/or cooling the interior of the vehicle.

Furthermore, the passenger cell module may be provided with center consoles of different sizes (in relation to the width and/or length). The decisive feature here is the extent in the longitudinal direction X of the vehicle. Furthermore, the passenger cell module can receive different driver assistance units, such as, for example, a head-up display. Similarly, different entertainment units may be provided, such as, for example, different loudspeaker installations.

In a preferred embodiment of the invention, the passenger cell modules have uniform front wall regions so that different front-end modules can be connected. As a result, the front wall forms a "commonality center", that is to say, a uniform interface between different front-end and passenger cell modules. It is advantageous in this case if the front wall region has uniform openings for components (for example, elements of the steering, the air-conditioning unit, the brake unit, bushings for lines, etc.) and for lines. The lines may be electrical lines, in particular a portion of a cable harness or media-routing lines. The components may be, for example, the steering column, components of the pedal system, the brake device, etc. The front wall is constructed in such a manner that at the front side the at least two front-end modules can be flange-mounted on the front wall with the different spacings of the engine mounts without any limitation.

The front wall preferably has uniform introduction planes, that is to say, regions which are provided for the introduction of components and lines, so that the precise introduction openings can be introduced where applicable in the individual case. In addition, the front wall also has "variable" regions in order, for example, to be able to produce different vertical positions of the air-conditioning unit, for example, in order to constitute the difference between a sports vehicle and a Sports Utility Vehicle within the group of vehicles. The respective vehicle-specific adaptation, for example, with regard to the position of the windshield and/or the cowl, can also be produced with the variable regions of the uniform front wall.

The scaling of the different heights of the R points is achieved by a different positioning of the front wall in the vertical direction (Z) in the vehicle. In a particular manner, the scaling results in a vertical direction Z as a result of different distribution of the openings over the vertical extent of the front wall.

An important aspect for the entire configuration and the outward appearance of a motor vehicle is the spacing thereof between the center of the front wheels and the instrument panel ("dash-axle spacing"). In order to distinguish between vehicles of the individual vehicle classes, this spacing must be varied accordingly within the context of the scaling possibilities.

In another embodiment of the invention, the front-end and the passenger cell modules can be combined with at least two different rear-end modules. The rear-end modules are with different receiving members for different rear axle systems (for example, multi-link rear axles with different configurations) and/or for different types of rear sound absorbers (for example, shell dampers, winding dampers) and/or fuel addition systems (for example, urea supply) and/or rear axle control systems (with air suspension) and/or spare wheel concepts (with full-size spare wheel or with an "emergency" spare wheel or without any spare wheel).

In one embodiment of the invention, a "receptacle" for control devices, media containers, etc., is provided in the rear-end module. The structural space for the receptacle is reserved in all rear-end modules. The connection locations for the receptacle are standardized in all rear-end modules.

A transverse rear sound absorber of the exhaust gas installation is preferably provided adjacent to the receptacle, for example, in the configuration as a winding sound absorber.

It is particularly advantageous if the connection locations are provided for an energy storage module in the region under the bench type rear seat in all motor vehicles according to the invention in an identical manner. Consequently, it is possible to carry out for all the motor vehicles of the group according to the invention, in principle without any limitation, a "hybridization", that is to say, the provision with an electric motor in addition to the internal combustion engine by the spatial requirement being reserved for an electrical energy store. Consequently, the energy storage module forms a "commonality center" in the rear-end module, comparable with the above-described front wall as a "commonality center" between different front-end and passenger cell modules.

The invention preferably relates to motor vehicles which are in principle provided with a rear-wheel drive (standard drive) and alternatively (where applicable in at least one model variant only) are provided with all-wheel drive.

The decisive aspect is that a uniform underbody is used for the passenger cell modules and therefore for the entire group of motor vehicles. The uniform underbody is characterized by an identical width for all the vehicles of the group. Different vehicle widths are constituted, for example, by different door sill trims. Similarly, different side frames can be used. The underbody must be provided so that front-end modules with different spacings of the engine mounts can be connected thereto. The expansion of the positions of the front seats and/or the rear seats is carried out by different transverse seat carriers which may further have where applicable consoles for the adjustment of the vertical position. The central tunnel-like member can also be constructed in the underbody so that it is suitable for motor vehicles both with standard drive and with all-wheel drive. The different length of the individual vehicles of the group is achieved using a uniform underbody where applicable by being cut or pieced together, preferably in the region of the rear seats.

Significant features which are carried out in the individual modules of the group of motor vehicles according to the invention are set out below: a uniform drive train and/or a continuous concept for implementing a hybrid drive by providing a structural space for an electrical store and/or a uniform underbody (which is also suitable for vehicles with rear-wheel drive and with all-wheel drive) and/or a uniform front wall and/or a preferably air-controlled air-conditioning unit (the air-conditioning unit can be arranged on the front wall as a result of the air control) and/or a rear-axle system with a spatial link axle in different embodiments and/or a receptacle in the rear-end module, where applicable in conjunction with a transverse rear sound absorber.

As already mentioned above, advantages are produced in a particular manner in motor vehicles with a standard drive which have an underbody which is configured so that it can also be used when these motor vehicles are provided with an all-wheel drive. Consequently, it is not necessary to keep variants of the underbody for drive variants of the motor vehicle.

Furthermore, advantages are produced in a particular manner in motor vehicles which are provided with an internal combustion engine as the drive unit and which have an underbody which is configured in such a manner that it can also be used when these motor vehicles have an electric motor as an additional drive unit. In this case, it may be advantageous to configure the underbody in a uniform manner from the front wall region only as far as the so-called heelboard while the region of the base plate behind the heelboard is configured differently in accordance with the construction with only an internal combustion engine (fuel tank in the region under the rear seats) or with a hybrid drive (battery in the region under the rear seats and fuel tank in a region behind the heelboard).

The term "common component" (similarly to the term "uniform" component) includes unprocessed components which are produced with the same deep-drawing tool. Following the production in the pressing plant, these "common components" can be changed by being shortened or lengthened in terms of the longitudinal dimension thereof. During shortening by cutting, for example, a longitudinal carrier or a deep-drawn planar sheet metal portion which is generally used for motor vehicles of two or more vehicle classes is shortened depending on the vehicle class by being cut at one of the end portions thereof for the motor vehicles of the smaller vehicle class(es). Alternatively, the longitudinal carrier or the sheet metal portion can also be lengthened by fitting a lengthening piece depending on the vehicle class by riveting, welding, screwing, adhesive-bonding, etc. These adaptations in terms of length, by cutting to length (cutting) or by lengthening (piecing together) are production steps which are carried out as a subsequent measure in "common components" which are produced beforehand with a uniform deep-drawing tool so that only comparatively low operating and tool costs are involved for these subsequent measures.

Deep-drawn sheet metal components are, for example, the front wall, base plate, longitudinal carriers, etc. The sheet metal material may be homogeneous over the surface extent thereof or, for example, be formed by a so-called "tailored blank".

The term "common component" further includes (similarly to the term "uniform" component) unprocessed components which are produced with the same casting tool. The advantage of cast components involves inter alia the large variety of possibilities of integrating functions, fitted components, connection regions, etc. For example, telescopic leg receiving members can advantageously be formed by cast components.

The term "common component" further comprises (similarly to the term "uniform" component) unprocessed components which are produced with the same extrusion tool. Extrusion profiles have a cross-section which remains constant over the longitudinal extent thereof. Extrusion profiles are particularly suitable for the construction of longitudinal carriers. Extrusion profiles can be produced with different lengths or be shortened subsequently by cutting to the necessary length. Furthermore, extrusion profiles can be partially changed in terms of the cross-section thereof by subsequent processing, such as, for example, by milling in order to remove a chamber in a multi-chamber profile.

In principle, different hole patterns for connecting the "common component" to the body-in-white and/or to fitted components can be fitted to the "common components" of each individual module depending on the vehicle class by punching, drilling, etc. However, the important aspect for the "common components" is that after the production in the same deep-drawing tool no additional shaping changes are carried out. By using a uniform deep-drawing tool which extends over vehicle classes, the investment costs for the production devices are substantially reduced. Different hole patterns are necessary, for example, during the production of motor vehicles in different national configurations as so-called "left-hand drive" or "right-hand drive" types, because of the laterally transposed openings in the front wall for the steering, brakes, etc.

Naturally, "common components" can also at least partially be constructed as identical components.

The positional designations which are used in connection with the present invention "front" and "rear" and terms derived therefrom relate to the fitted position of the relevant components in the motor vehicle and the direction of travel of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
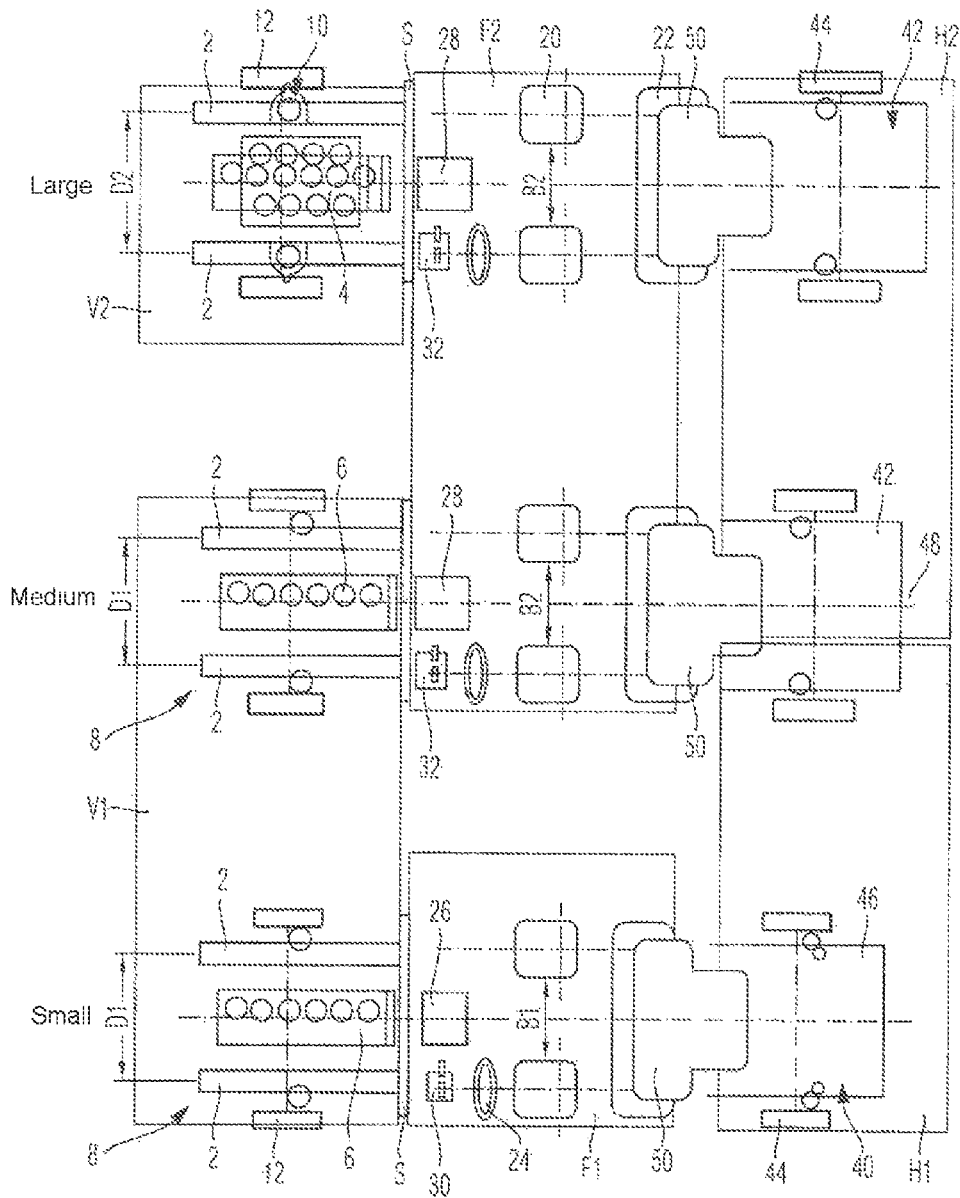
FIG. 1 is a schematic overview of the possible combinations within a group of motor vehicles according to the invention.

FIG. 1 is a schematic illustration of an overview regarding the possible combinations which results for a group of motor vehicles comprising two front-end modules V1 and V2, two passenger cell modules F1 and F2 and two rear-end modules H1 and H2. The connection between the front-end module V1 and V2 and the passenger cell module F1 and F2, respectively, is brought about by means of a "communal" front wall S. In the connection region between the passenger cell module FI and F2 and the rear-end module H1 and H2 there is provided a uniform electrical energy store 50. In this instance, the indices 1 and 2 stand for the simpler "basic variant" or the "high variant" which is constructed in a more complex manner.

The front wall modules V1 and V2 receive with the front longitudinal carriers 2 thereof ("engine mounts") inter alia drive units ("engines") 4 and 6 and front axle systems 8 and 10 with front wheels 12, respectively. The two front-end modules V1 and V2 differ in terms of the spacing D1 and D2 of the engine mounts 2. While the front-end module V2 is configured for receiving large engines 4, for example, V8 engines, and, for example, has a spacing D2 of 788 millimeters, the front-end module 1 is provided only for receiving smaller engines 6, for example, in-line engines up to a maximum of six cylinders, for which a spacing D1 of, for example, 762 millimeters is sufficient. Similarly, the two front-end modules V1 and V2 are constructed to receive different front axle systems 8: while the front-end module V1 receives a comparatively simply constructed front axle system 8, such as, for example, a telescopic leg axle, the front-end module V2 is configured to receive a more complex front axle system 10, such as, for example, a double wishbone axle. Furthermore, the front-end module V2 is capable of receiving an anti-roll system (ARS), that is to say, a system which connects the two front wheels 12 and which prevents the inclination of the vehicle structure partially or completely during travel round bends.

The passenger cell modules F1 and F2 receive inter alia front seats 20, rear seats 22, a steering wheel 24, air-conditioning units 26 and 28 and driver assistance systems 30 and 32, such as, for example, so-called "head-up displays", respectively. While the passenger cell module F1 has a spacing B1 of, for example, 375 millimeters between the front seats 20, the passenger cell module F2 has a greater spacing B2 of, for example, 395 millimeters, whereby a more generous provision of space is produced for the driver and passenger. Furthermore, the two passenger cell modules F1 and F2 differ in terms of the complexity of the air-conditioning units 26 and 28: while the air-conditioning unit 26 can be controlled separately for the driver and passenger and also takes over the air-conditioning of the rear space to a limited extent (so-called "2.5-zone air-conditioning unit"), the air-conditioning device 28 is configured as a "4-zone air-conditioning unit" with separate adjustment possibilities for the driver, passenger and the two rear-seat passengers who are sitting to the sides. The head-up displays 30 and 32 also differ in terms of the capacity thereof, such as, for example, the size of the projection surface, wherein the "high" head-up display 32 has a greater structural space requirement as a result of the greater capability thereof.

The rear-end modules H1 and H2 receive inter alia rear axle systems 40 and 42 with rear wheels 44 and a spare wheel system 46 and a rear axle control system 48, respectively. While the rear-end module H1 is constructed to receive a comparatively simply constructed rear-axle system 40 (for example, a spatial link axle with five links, for example, with separate spring/damping elements, with any anti-roll system), the rear-end module H2 receives a rear axle system 42 which is constructed in a more complex manner with a more powerful comfort orientation (for example, a spatial link axle with five links, for example, with a telescopic leg unit which, for example, can be arranged on a camber link or on the wheel carrier, where applicable with an anti-roll system and/or with a rear axle steering system). In this case, the rear axle system 42 forms a special feature because it can also be configured in a "spatially functional" manner, for example, for motor vehicles of the combination construction type and/or so-called Sports Utility Vehicles. For this type of motor vehicles, the rear axle system is configured so that it allows a storage space which is as large and wide as possible. The spare wheel system 46 may have a full-size vehicle wheel 12 or 44 or an emergency wheel or no spare wheel at all. The rear axle control system 48 may have, for example, different control devices, an air suspension, etc., depending on the level of equipment.

A uniform energy storage module 50 is provided in the transition region between the passenger cell modules F1 and F2 and the rear-end modules H1 and H2, respectively.

By combining the two front-end modules V1 and V2 with the two passenger cell modules F1 and F2 there are produced motor vehicles in three different vehicle classes which are characterized by the terms "small", "medium" and "large". These terms stand, for example, for "middle class", "upper middle class" and "upper class". The overlap regions of the individual modules V1 and V2 or F1 and F2 set out the possible combinations.

By combining the two passenger cell modules F1 and F2 with the two rear-end modules H1 and H2 there are produced additional variants. In this instance, the overlap regions of the individual modules F1 and F2 or H1 and H2 also set out the possible combinations.

Figure 2:
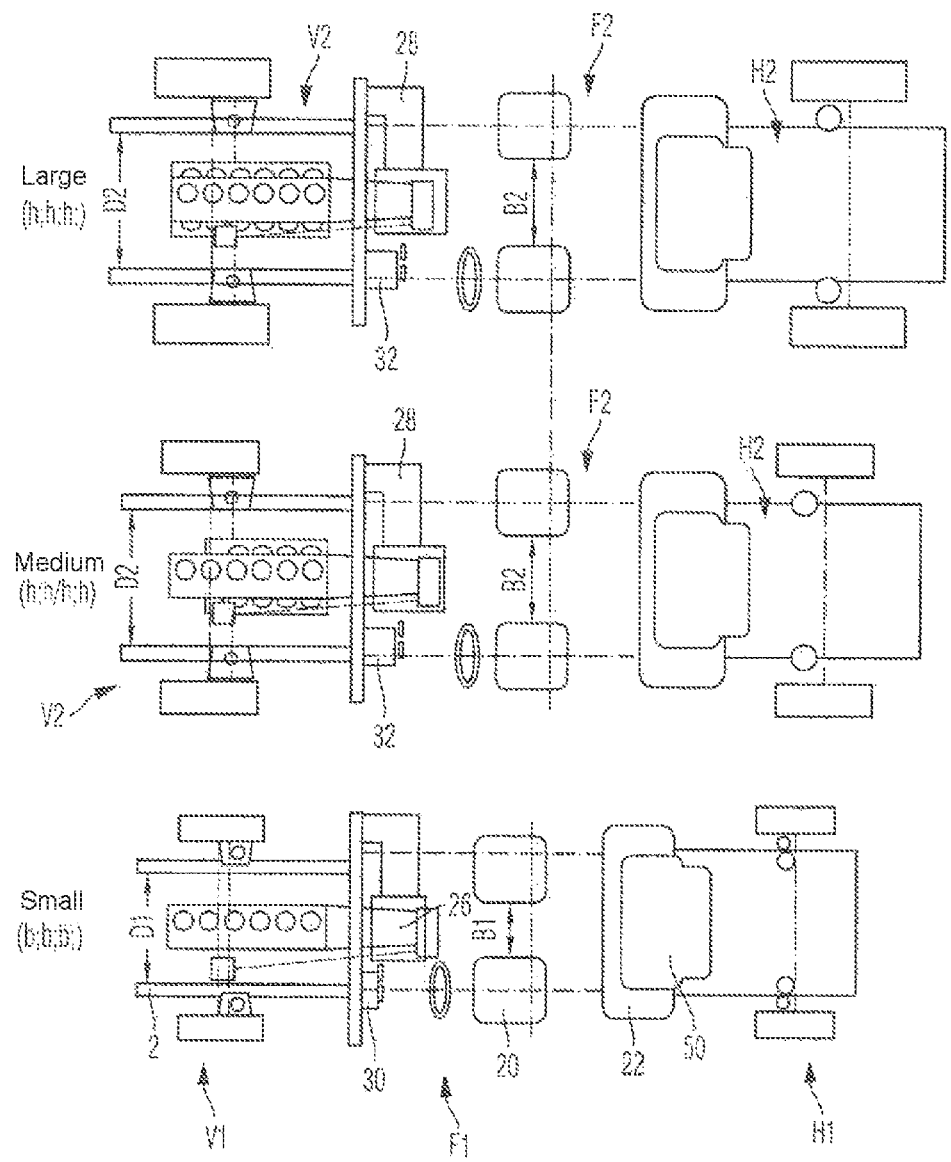
FIGS. 2 to 4 show examples of combinations within the group of motor vehicles according to the invention.
Figure 3:
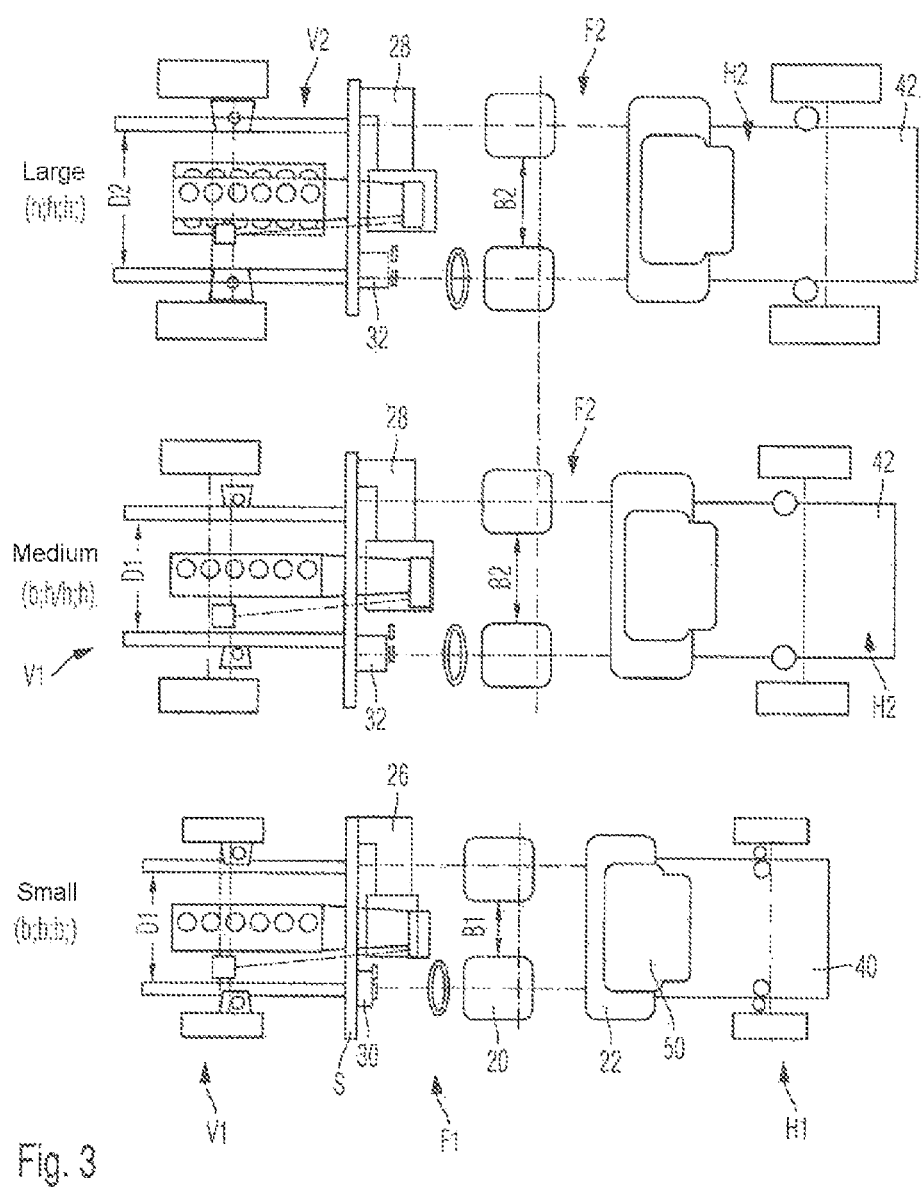
Figure 4:
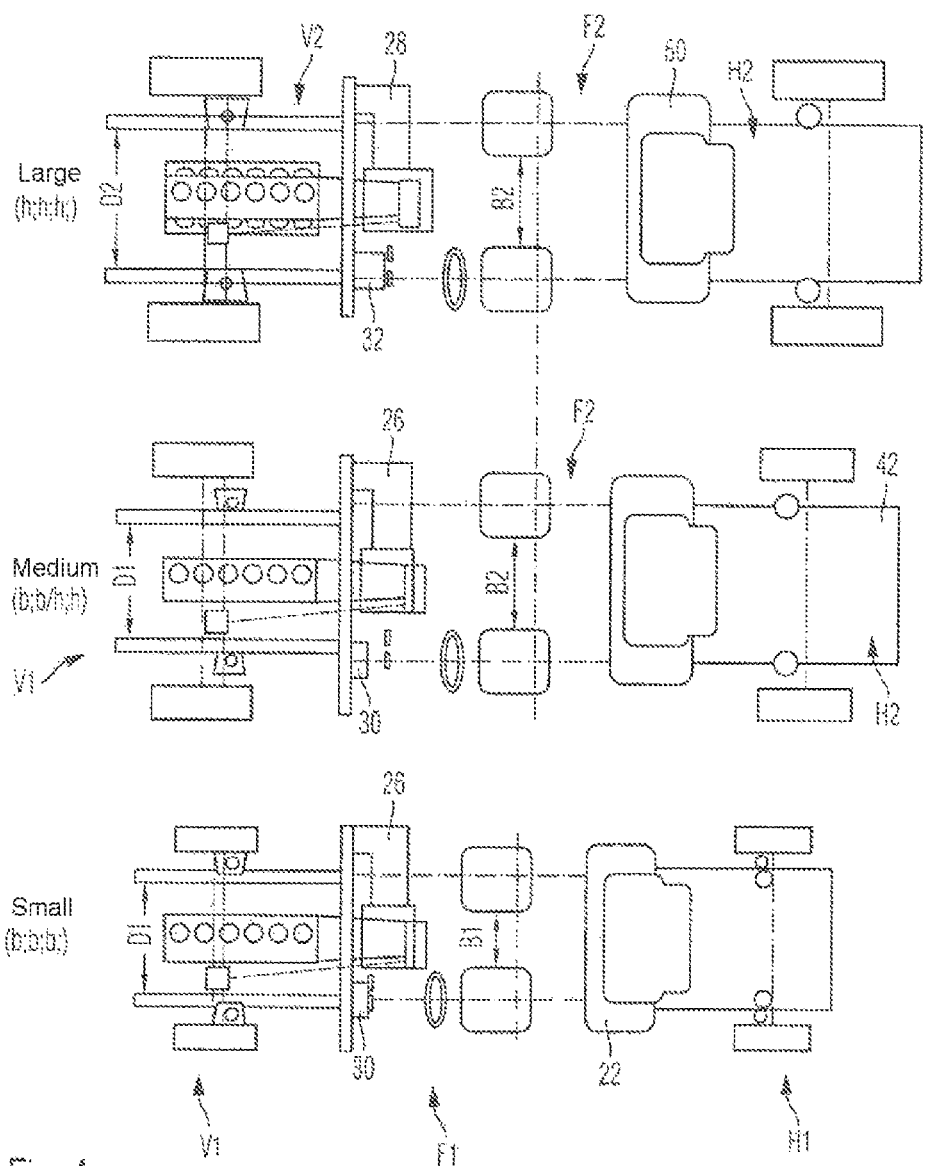

The possible combinations are explained by way of example with reference to FIGS. 2 to 4. In this case, the designations "KKL", "MKL" and "GKL" correspond to the designations "small", "medium" and "large". The designations "b" and "h" correspond to the indices 1 and 2, respectively, and accordingly stand for the simpler ("basic") and the more complex ("high") construction.

The motor vehicles of the vehicle class "small" are formed, for example, from the combination of the modules with the index 1, that is to say, from the modules V1, F1 and H1 ("b; b; b"). Similarly, the motor vehicles of the vehicle class "large" are always formed from the combination of the modules with the index 2, that is to say, from the modules V2, F2 and H2 ("h; h; h").

In addition to these preferred combinations for the vehicle classes "small" and "large" "in a horizontal plane", however, it is also possible in principle in the vehicle classes "small" and "large" to change with a module to the next higher or next lower level.

A plurality of possibilities are set out for the motor vehicles of the vehicle class "middle".

FIG. 2 illustrates a motor vehicle of the vehicle class "middle" with the following modules: a front-end module V2 with the greater spacing D2 of the engine mounts 2 (designated "h"), a passenger cell module F2 with "4-zone air-conditioning unit" 28 and "large head-up display" 32 and with a large spacing B2 between the front seats 20 (designated "h/h") and with a rear-end module H2 (designated "h"), that is to say, in the combination "h; h/h; h". This motor vehicle is a very high-grade vehicle with the possibility of a "large" motorization and a complex front axle system and a comfortable passenger space, for example, a sedan or a (four-door) coupe.

FIG. 3 illustrates a motor vehicle of the vehicle class "middle" with the following modules: a front-end module V1 with the smaller spacing D1 of the engine mounts 2 (designated "b"), a passenger cell module F2 with "4-zone air-conditioning unit" 28 and "large head-up display" 32 and with a large spacing B2 between the front seats 20 (designated "h/h") and with a rear-end module H2 (designated "h"), that is to say, in the combination "b; h/h; h". This motor vehicle is a very high-grade vehicle in the passenger compartment but with limitations in the case of the motorization and the front axle system, for example, a sedan or a vehicle of the combination construction type.

FIG. 4 illustrates a motor vehicle of the vehicle class "middle" with the following modules: a front-end module V1 with the smaller spacing D1 of the engine mounts 2 (designated "b"), a passenger cell module F2 with "2.5-zone air-conditioning unit" 26 and "small head-up display" 30 but with a large spacing B2 between the front seats 20 (designated "b/h") and with a rear-end module H2 (designated "h"), that is to say, in the combination "b; b/h; h". This motor vehicle is, for example, a cabriolet which does not require an air-conditioning device which can be controlled separately for the rear seats 22.

Naturally, additional combinations are possible. For example, the vehicle according to FIG. 4 can also be provided with a front-end module V2.

With regard to the rear-end module H2, in the motor vehicles of the vehicle class "middle" the following special feature can be seen in FIGS. 2 to 4: in this case, it is possible to select depending on the vehicle type between a "comfortable rear axle system 42" and a "spatially functional rear axle system 42", for example, for motor vehicles of the type "sedan" or "coupe" or for motor vehicles of the type "combination construction type" or "Sports Utility Vehicle".

The rear axle systems 40 and 42 are constructed, for example, as multi-link axles (for example, with five links) and have, for example, the above-described different embodiments: a rather cost-effective embodiment of a rear-axle system 40 with separate springs and dampers, a more complex embodiment of a rear axle system 42 (for example, with a connection of a so-called telescopic leg to a camber link) which constitutes a good compromise between spatial functionality, on the one hand, and comfort and acoustics, on the other hand, and a more complex embodiment of a rear axle system 42 which places the focus on comfort and acoustics with greater dynamics, for example, with a connection of the telescopic leg to the wheel carrier.

Figure 5:
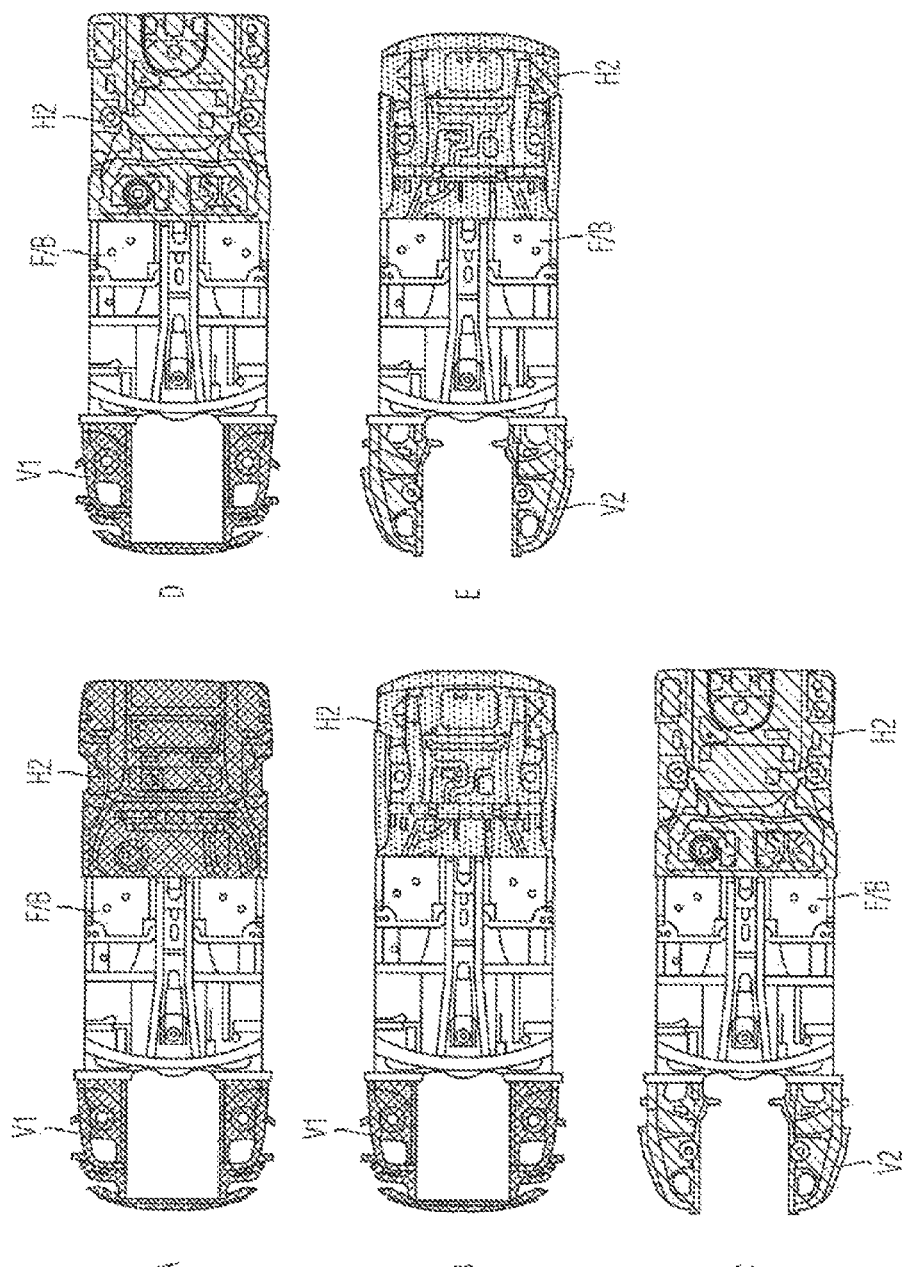
FIG. 5 shows an overview of different combinations within the group of motor vehicles according to the invention.

FIG. 5 clearly shows a number of possible combinations again.

The motor vehicle A is a middle class vehicle with a front-end module V1 and a rear-end module H1.

The motor vehicle B is an upper middle class vehicle with a front-end module V1 and a rear-end module H2 in a spatially functional embodiment, that is to say, for example, a "Sports Utility Vehicle" of the upper middle class or a vehicle of the upper middle class of the combination construction type.

The motor vehicle C is an upper class vehicle with a front-end module V2 and a rear-end module H2 in an embodiment orientated toward comfort, that is to say, for example, a sedan, a coupe or a cabriolet.

The motor vehicle D is an upper middle class vehicle with a front-end module V1 and a rear-end module H2 in an embodiment orientated toward comfort, that is to say, for example, a sedan.

The motor vehicle E is an upper class vehicle with a front-end module V2 and a rear-end module H2 in a spatially functional embodiment, that is to say, for example, a "Sports Utility Vehicle" of the upper class.

It is evident in a particularly clear manner from the individual illustrations in FIG. 5 that the passenger cell modules F which are not distinguished in greater detail are based on a uniform underbody B which does not differ in principle.

Figure 6:
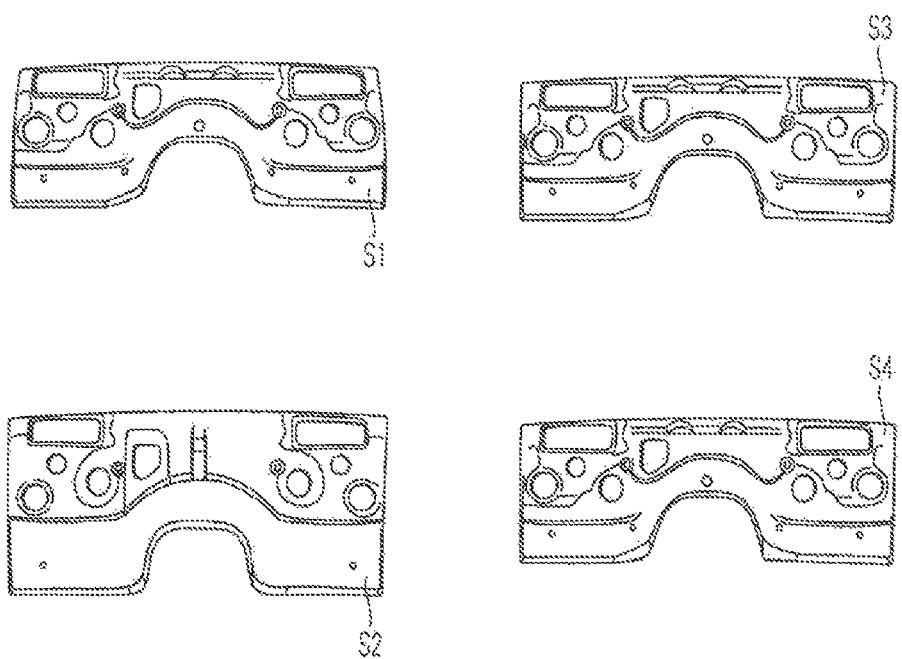
FIGS. 6 and 6A show different configurations of a uniform front wall.

FIG. 6 shows different front walls S in four embodiments S1 to S4. All the front walls S1 to S4 have a uniform hole pattern of the openings between the engine compartment and the passenger compartment but have a different geometry, with the exception of the front wall S2 which also has at least in part-regions a different hole pattern. The front wall S1 belongs to a motor vehicle of the middle class, the front wall S2 belongs to a motor vehicle of the upper class of the "Sports Utility Vehicle" type, the front wall S3 belongs to a motor vehicle of the upper middle class and the front wall S4 belongs to a motor vehicle of the upper class.

Figure 6A:
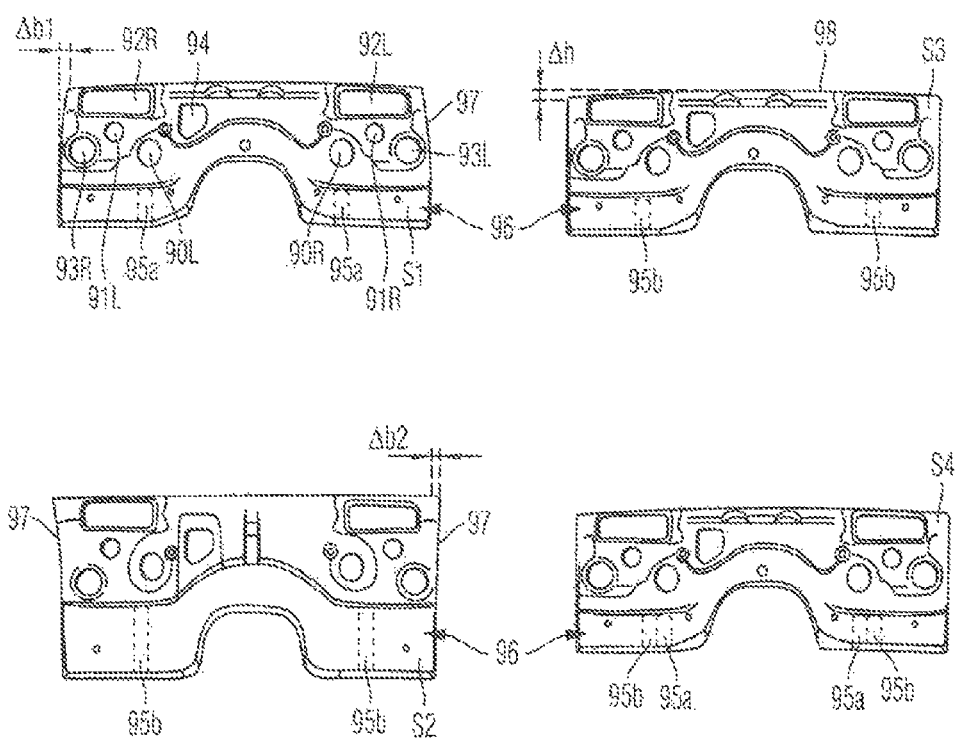
Figure 7:
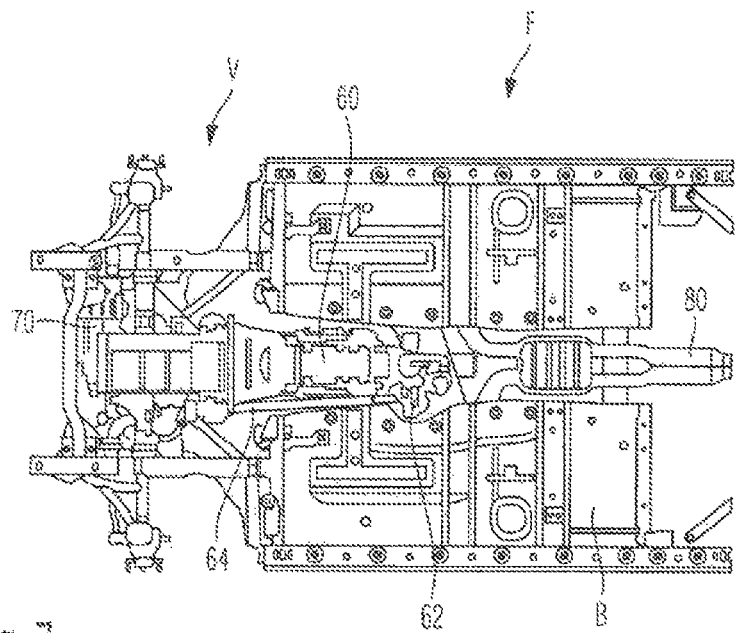
FIGS. 7 to 11 show examples of combinations of front-end and passenger cell modules within the group of motor vehicles according to the invention.
Figure 8:
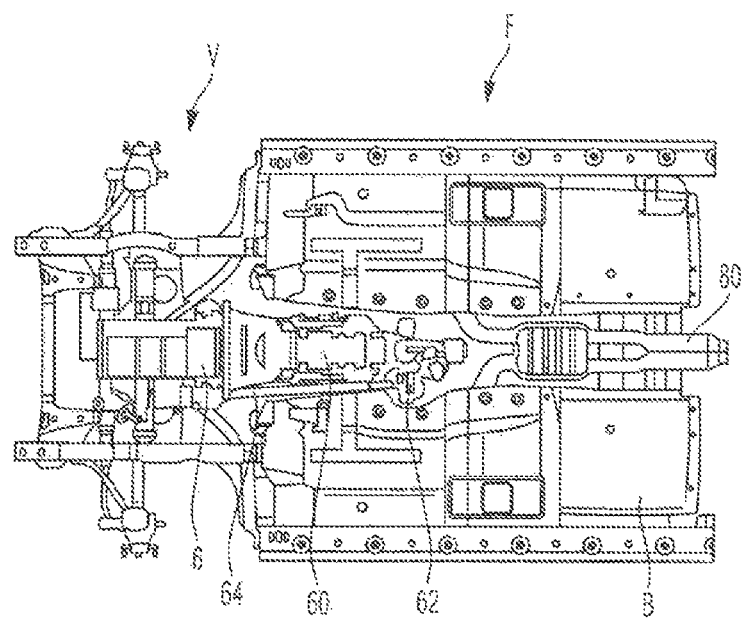
Figure 9:
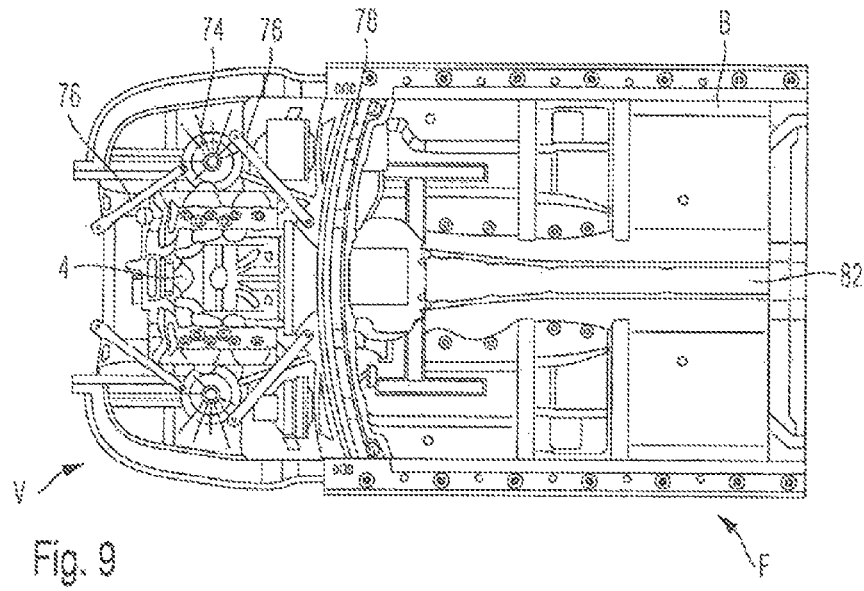
Figure 10:
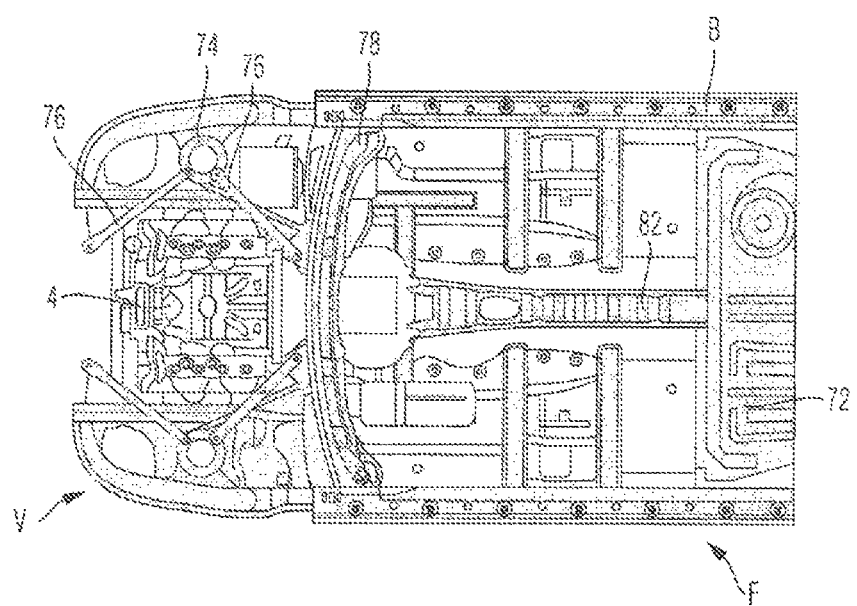
Figure 11:
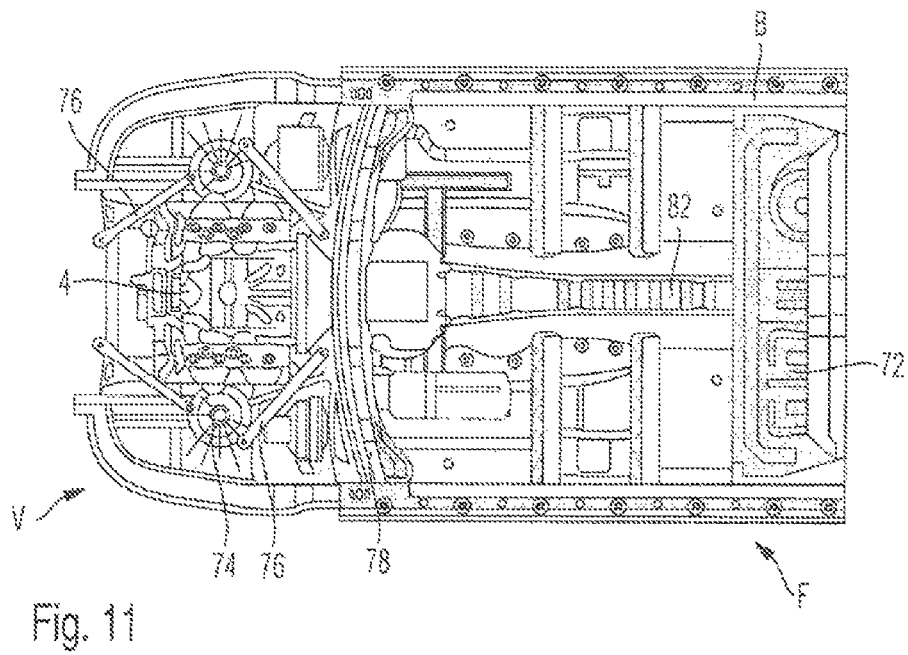

In FIG. 6A, additional details are indicated on the above-described front walls S1 to S4. The viewing direction toward the front walls S1 to S4 is in the direction from the interior, as in FIG. 6.

The individual openings in the front walls S1 to S4 are specified in greater detail using the example of the front wall S1, wherein the letters "L" and "R" stand for "left-hand drive" and "right-hand drive", respectively: openings 90L and 90R for a steering column, openings 91L and 91R for a brake device, openings 92R and 92L for the intake of heating air, openings 93R and 93L for a cable bushing of a body cable harness and an opening 94 which forms a media interface for an air-conditioning device of the motor vehicle.

The respective front walls S1 to S4 can be provided with both the openings for the left-hand drive variants and the openings for the right-hand drive variants, wherein the unnecessary openings are closed by plugs or the like.

Alternatively, there can be used in the unprocessed body front walls S1 to S4 which do not have any openings (or only openings which are uniform in the case of left-hand and right-hand drive variants), wherein the openings which are different in the case of left-hand and right-hand drive variants are introduced in the front walls S1 to S4 only subsequently in the production line of the motor vehicle by punching devices or the like ("late configuration").

The position of the connection regions in which the front longitudinal carriers 2 of the motor vehicle are connected to the front side of the front walls S1 to S4 is indicated with the reference numbers 95a and 95b. In this case, the connection regions 95a stand for the connection of a front-end module V1 ("basic variant") and the connection regions 95b stand for the connection of a front-end module V2 ("high variant"). In the case of the front wall S2, the special feature is still provided in this case that the connection region 95b has a greater vertical extent in accordance with the higher profile of the longitudinal carrier 2 in the case of the associated motor vehicle of the upper class of the "Sports Utility Vehicle" type.

As can be seen in particular on the front wall S2, the individual front walls S1 to S4 may be different with regard to the vertical extent h thereof. Thus, the front wall S2 has in accordance with the associated motor vehicle of the upper class of the "Sports Utility Vehicle" type a greater vertical extent h than the remaining front walls S1, S3 and S4 of the associated motor vehicles of the "sedan" type, in particular a more extensive lower region 96 which is used as a connection region for the front longitudinal carriers 2.

Furthermore, it is possible to adapt the front walls S1 to S4 to the width and/or the geometry of the respective motor vehicle by cutting accordingly at the left and right edge region 97 and/or the upper-side edge region 98. Thus, a lateral cut in the edge regions 97 is carried out in the case of the front wall S1 of the associated motor vehicle of the middle class so that a smaller inner width is produced in this motor vehicle type, in a manner indicated by the dimensional indication Δb1. Conversely, the front wall S2 is cut at the lateral edge regions 97 thereof so that the front wall S2 produces at the upper side a greater inner width Δb2 in accordance with the associated motor vehicle of the upper class of the "Sports Utility Vehicle" type. As can be seen with reference to the front wall S3, an adaptation to the typical extent of the so-called cowl for the respective vehicle class, that is to say, of the carrier which extends in the transverse direction Y of the vehicle under the windshield of the motor vehicle, can be carried out by a cut at the upper-side edge region 98. In the present case, the front wall S3 can be adapted to a cowl which is drawn laterally slightly downward.

In this case, it is in principle significant that the starting material for the uniform front walls S1 to S4 have the width or height of the "largest" front wall so that the variation at the edge regions 97 or 98 or at the lower edge region can be carried out by cutting (with the bulge thereof for the introduction of the gear mechanism housing).

The front wall S2 has, as already mentioned above, a hole pattern which is partially different from the front walls S1 and S3 and S4. Furthermore, not only is the front wall S2 higher but it also has in the lower region 96 thereof a different geometry from that of the front walls S1 and S3 and S4. In principle, however, the front wall S2 could also be constructed in a uniform manner similarly to the front walls S1 and S3 and S4.

FIGS. 7 to 11 are plan views of different combinations of a front-end module V with a passenger cell module F. The passenger cell module F is illustrated partially with and partially without a central tunnel-like member. All the illustrations of the passenger cell module F clearly show that the passenger cell module F is formed by a uniform base plate B. Depending on the type of vehicle, the base plate B is provided with reinforcements. Where applicable, the transverse seat carriers are raised in the manner of a console in order to achieve a higher sitting position.

The following points should be emphasized in detail in FIGS. 7 to 11: engines (in-line four-cylinder or V8) with a flange-mounted gear mechanism 60, with a distribution gear mechanism output 62 with an output shaft 64 which extends "close" to the gear mechanism 60 and which leads to a front axle gear mechanism 66 and drive shafts 68 for the front wheels 12 (all-wheel drive), front axle systems with different front axle carriers, steering mechanisms 70, additional sheet metal shells 72 in the rear region of the passenger cell module F, telescopic leg supports 74 with reinforcement struts 76 which inter alia are connected to a so-called cowl 78 and an exhaust gas installation 80 which extends at the lower side of the central tunnel-like member 82.

Figure 12:
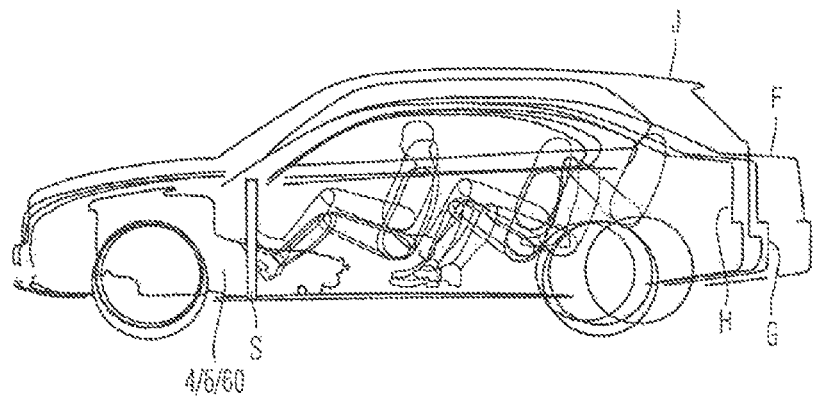
FIG. 12 is a schematic contour diagram on the basis of a fixed drive train.

FIG. 12 clearly shows the derivation of different motor vehicles with a uniform position of the drive train: as a result of the above-described scaling measures and in addition a height raster of the front wall S, different vehicle types can be derived, that is to say, a sedan F of the upper class, a sedan G of the upper middle class, a sedan H of the middle class and a Sports Utility Vehicle J of the upper class.

Figure 13:
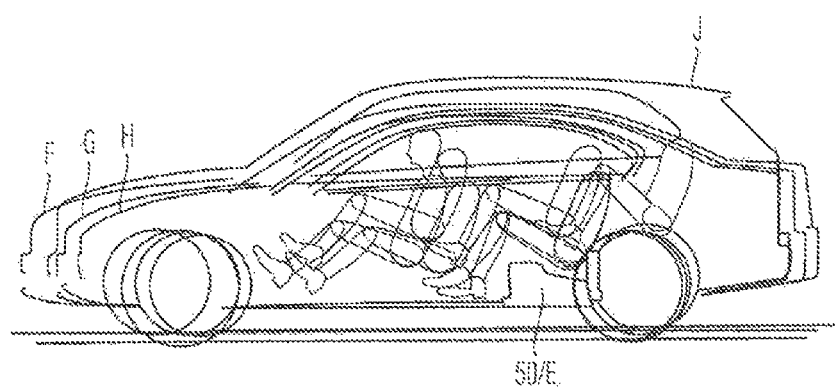
FIG. 13 is an illustration corresponding to FIG. 12 on the basis of a fixed electrical storage unit.

The similar illustration of FIG. 13 shows the derivation of different motor vehicles with the uniform position of the communal energy storage module E: as a result of corresponding measures for longitudinal scaling in the rear car, different vehicle types can be derived, that is to say, a sedan F of the upper class, a sedan G of the upper middle class, a sedan H of the middle class and a Sports Utility Vehicle J of the upper class.

The invention can be summarized as follows: as a result of the combination of at least two different front-end and passenger cell modules V1 and V2 and F1 and F2, respectively, at least two groups of motor vehicles which belong to different vehicle classes can be formed. To this end, the two front-end modules V1 and V2 are provided with different spacings D1 and D2 of the engine mounts 2 and the two passenger cell modules F1 and F2 are provided with different spacings B1 and B2 of the front seats 20. The individual variants of each of these four modules V1, V2, F1 and F2 are in this case constructed as common components and are produced for the respective module V1, V2, F1 and F2 in uniform deep-drawing tools.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A group of motor vehicles, comprising:
   at least two front-end modules with different spacings of engine mounts;
   at least two passenger cell modules with different spacings of front seats, wherein
      the at least two front-end modules and the at least two passenger cell modules are combinable such that at least two groups of motor vehicles of different vehicle classes are producable, each group having at least one of said modules constructed as a common component.

2. The group of motor vehicles as claimed in claim 1, wherein
   three groups of motor vehicles of different vehicle classes are producable from two front-end modules and two passenger cell modules.

3. The group of motor vehicles as claimed in claim 1, wherein
   the front-end modules are constructed to receive different types of drive systems, drive units, gear mechanisms, and/or front axle systems.

4. The group of motor vehicles as claimed in claim 1, wherein
   the passenger cell modules are constructed to: (i) differently position driver and passenger seats and/or (ii) receive different air-conditioning units, central consoles, driver assistance units and/or entertainment units.

5. The group of motor vehicles as claimed in claim 1, wherein
   the passenger cell modules have a uniform front wall region which is constructed to connect different front-end modules.

6. The group of motor vehicles as claimed in claim 5, wherein
   the front wall region has uniform connection regions with respect to the front-end modules and/or uniform openings for steering.

7. The group of motor vehicles as claimed in claim 1, further comprising:
   at least two rear-end modules.

8. The group of motor vehicles as claimed in claim 7, wherein
   the rear-end modules are constructed to receive different rear axle systems, rear sound absorbers, fuel addition systems, rear axle control systems and/or to receive or to omit a spare wheel.

9. The group of motor vehicles as claimed in claim 7, wherein
   an energy storage module is provided in a transition region between the passenger cell module and the rear-end module.

10. The group of motor vehicles as claimed in claim 1, wherein
    the underbody of the passenger cell modules are constructed as a common component.

11. A method of producing motor vehicles, the method comprising the acts of:
    making available at least two front-end modules having different spacings of engine mounts;
    making available at least two passenger cell modules having different spacings of front seats; and
    selectively combining a respective one of the at least two front-end modules with a respective one of the at least two passenger cell modules to produce a first group of motor vehicles of a first vehicle class;
    selectively combining a respective one of the at least two front-end modules with a respective one of the at least two passenger cell modules to produce a second group of motor vehicle of a second vehicle class, wherein
    each group has at least one module constructed as a common component.

12. The method as claimed in claim 11, wherein
    individual variants of each of the two front-end modules and the two passenger cell modules are common components.

13. The method as claimed in claim 12, wherein
    the common components are produced via one of deep-drawing, casting via a same casting tool, and extruding via a same extrusion tool.

* * * * *